(12) United States Patent
Hotta et al.

(10) Patent No.: US 9,925,948 B2
(45) Date of Patent: Mar. 27, 2018

(54) AIRBAG

(71) Applicant: TOYODA GOSEI CO., LTD., Kiyosu-shi, Aichi-ken (JP)

(72) Inventors: Masashi Hotta, Kiyosu (JP); Takashi Iida, Kiyosu (JP); Yuji Sato, Kiyosu (JP); Ikuo Yamada, Kiyosu (JP); Mikine Hayashi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/276,900

(22) Filed: Sep. 27, 2016

(65) Prior Publication Data

US 2017/0088080 A1  Mar. 30, 2017

(30) Foreign Application Priority Data

Sep. 29, 2015 (JP) ................. 2015-191982

(51) Int. Cl.
*B60R 21/2338* (2011.01)
*B60R 21/203* (2006.01)
*B60R 21/235* (2006.01)

(52) U.S. Cl.
CPC ...... *B60R 21/2338* (2013.01); *B60R 21/2037* (2013.01); *B60R 21/235* (2013.01); *B60R 2021/23533* (2013.01)

(58) Field of Classification Search
CPC ................................. B60R 21/2338
USPC .................. 280/731, 743.1, 743.2
See application file for complete search history.

(56) References Cited

U.S. PATENT DOCUMENTS

| | | | | |
|---|---|---|---|---|
| 3,874,693 | A | * | 4/1975 | Patzelt .......... B60R 21/233 280/731 |
| 5,205,584 | A | * | 4/1993 | Honda .......... B60R 21/217 280/743.2 |
| 7,726,685 | B2 | * | 6/2010 | Abe .......... B60R 21/2338 280/736 |
| 2003/0168842 | A1 | * | 9/2003 | Igawa .......... B60R 21/233 280/743.2 |
| 2005/0173897 | A1 | | 8/2005 | Abe et al. |

(Continued)

FOREIGN PATENT DOCUMENTS

| JP | 2005-247272 A | 9/2005 |
|---|---|---|
| JP | 2006-315494 A | 11/2006 |
| JP | 2015-116912 A | 6/2015 |

*Primary Examiner* — Faye M Fleming
(74) *Attorney, Agent, or Firm* — Posz Law Group, PLC

(57) ABSTRACT

An airbag is inflatable in such a manner as to separate a vehicle-side wall which is deployable towards a vehicle body structure and an occupant-side wall which is deployable towards an occupant for catching the occupant. The airbag is configured to be supported by the vehicle body structure on the vehicle-side wall when catching the occupant with the occupant-side wall. The airbag includes a recessed section on left and right sides of and in a vicinity of the center of the occupant-side wall and a tether that connects the bottom of the recessed section to the vehicle-side wall in order to form the recessed section. Opposing walls of the recessed section press each other in a separable fashion when the airbag is inflated. The tether allows gas communication between a central region of the airbag and a peripheral region of the airbag which surrounds the central region, inside the airbag.

9 Claims, 12 Drawing Sheets

(56) References Cited

U.S. PATENT DOCUMENTS

2006/0232049 A1* 10/2006 Abe .................. B60R 21/233
　　　　　　　　　　　　　　　　　　　　　280/729

* cited by examiner

AIRBAG

CROSS REFERENCE TO RELATED APPLICATIONS

The Present application claims priority from Japanese Patent Application No. 2015-191982 of Hotta et al., filed on Sep. 29, 2015, the entire disclosure of which is incorporated herein by reference.

BACKGROUND OF THE INVENTION

1. Field of the Invention

The present invention relates to an airbag which is mountable on a vehicle for catching a vehicle occupant such as a driver and a front-seat passenger in the event of an oblique collision or the like.

2. Description of Related Art

JP 2015-116912 A, by way of example, discloses a known airbag, which is an airbag for a driver's seat. The airbag is internally provided with a tether as a countermeasure against a small overlap crash. The tether is arranged along a width direction of a vehicle inside the airbag, and helps the airbag to catch the head, including the face, of the driver who moves in an oblique direction without turning the head in the event of a small overlap crash.

Although the airbag of the above-mentioned reference is prevented from bulging in a width direction of the vehicle at deployment because of the tether, it cannot avoid protruding towards a direction orthogonal to the width direction of the vehicle, i.e., rearward or towards the driver, in an initial phase of airbag deployment. That is, the above airbag has a room for improvement in deployment behavior in the initial phase of deployment.

JP 2005-247272 A discloses another known airbag for a driver's seat which is partitioned into more than one chambers each of which is inflatable with a suitable internal pressure. More specifically, the airbag includes a first chamber which is disposed at the center of the airbag and a second chamber which has such an annular shape as to encircle the first chamber and is inflatable with a lower internal pressure than the first chamber. Each of the first chamber and second chamber has its own circumferential wall, and therefore, the tubular regions of the circumferential walls of the first chamber and second chamber at the border of the first and second chambers are disposed in such a manner as to connect a driver-side wall of the airbag deployable towards the driver and a vehicle-side wall of the airbag deployable towards the vehicle body structure. In other words, the tubular regions of the circumferential walls of the first and second chambers serve as a tether and help prevent the central region of the driver-side wall from protruding too much rearward and towards the driver. However, with the lower internal pressure than the first chamber, the second chamber is easily deformable and thus is not suitable for catching the driver (vehicle occupant) without turning him in the event of an oblique crash.

SUMMARY OF THE INVENTION

An object of the present invention is to provide an airbag which does not protrude towards a vehicle occupant unduly in an initial phase of deployment and is capable of catching the occupant in an adequate fashion when he moves towards an oblique direction.

The airbag of the invention includes a vehicle-side wall which is deployable towards a vehicle body structure and an occupant-side wall which is deployable towards a vehicle occupant for catching the occupant. The airbag is inflatable with an inflation gas in such a manner as to separate the vehicle-side wall and the occupant-side wall, and is configured to be supported by the vehicle body structure on the vehicle-side wall when catching the occupant with the occupant-side wall. The airbag includes a recessed section that is recessed towards the vehicle-side wall on left and right sides of and in a vicinity of the center of the occupant-side wall as fully inflated, and a tether that connects the bottom of the recessed section to the vehicle-side wall in order to form the recessed section. The tether is configured in such a manner as to provide gas communication between a central region of the airbag as inflated, which is disposed in a vicinity of the center of the occupant-side wall, and a peripheral region of the airbag as inflated, which surrounds the central region and is disposed in a vicinity of the outer circumferential edge of the occupant-side wall, in an interior of the airbag. A pair of opposing walls that extend from the bottom of the recessed section to the occupant-side wall in an opposed fashion and form the recessed section press each other in a separable fashion when the airbag is fully inflated.

In the airbag of the invention, the tether connects the bottom of the recessed section to the vehicle-side wall, in other words, connects the occupant-side wall and vehicle-side wall. Therefore, the tether helps prevent the occupant-side wall from protruding too much towards a direction away from the vehicle-side wall in an initial phase of airbag deployment.

The opposing walls forming the recessed section, which extend up to the bottom of the recessed section, are configured to press each other in a separable fashion at airbag deployment. When, by way of example, the head of a driver, who moves obliquely towards left or right, hits a vicinity of the recessed section, this configuration will enable a region of the airbag disposed on an outside of the recessed section to be deformed in such a manner as to follow the movement of the head. Therefore, the region disposed outside of the recessed section will catch and cushion the head of the driver without turning the head.

If, by way of another example, the head of a driver moving obliquely towards left or right hits a vicinity of the recessed section, the head possibly enters into the recessed section while separating the opposing walls of the recessed section from each other. In this instance, the walls will enfold the head and catch and cushion the head of the driver without turning the head.

In the airbag of the invention, moreover, the tether is configured in such a manner as to provide gas communication between the central region and the peripheral region of the airbag inside the airbag. That is, the tether does not partition the interior of the airbag. This configuration will not cause a difference in pressure (internal pressure) between the regions of the airbag disposed inside and outside of the recessed section, such that the airbag will be capable of catching the driver in a suitable fashion with the regions of the occupant-side wall.

Therefore, the airbag of the invention does not protrude towards the vehicle occupant unduly in an initial phase of deployment and is capable of catching the occupant in an adequate fashion when he moves towards an oblique direction.

The airbag of the invention may be configured as a driver's seat airbag which is mounted on a boss section which is disposed in a vicinity of a generally center of a rim of a steering wheel such that the vehicle-side wall is deployable towards the rim of the steering wheel and the occupant-side wall is deployable towards the driver's seat for catching a driver.

If the airbag of the invention is so configured, the tether will prevent the airbag from protruding rearward and towards the driver in an initial phase of airbag deployment, and the airbag will be capable of catching the driver who moves towards an oblique direction in an adequate fashion with the recessed sections disposed in the left and right regions of the airbag.

In the above-described airbag, it is further desired that the recessed section is formed in an annular fashion around the vicinity of the center of the occupant-side wall.

With this configuration, the recessed section will be always disposed on the left and right of and in the vicinity of the center of the occupant-side wall even when the steering wheel is rotated, by way of example, at 90 degrees, in a similar fashion to an instance where the steering wheel is steered straight ahead. That is, the airbag will be able to protect the driver, when he moves obliquely, regardless of the steering angle of the steering wheel.

In the above instance, it is desired that occupant-side wall is composed of the opposing walls which form the recessed section, a peripheral panel which is annular in shape and disposed on an outside of the recessed section, and a central panel which is circular in shape and disposed on an inner side of the recessed section. It is also desired that each of the opposing walls of the recessed section is joined to an outer circumferential edge of the central panel and an inner circumferential edge of the peripheral panel.

With this configuration, the depth of the recessed section can be easily adjusted by changing the length of each of the components of the opposing walls between the bottom of the recessed section and the leading end.

In the above instance, it is further desired that, out of the opposing walls of the recessed section, a center-side wall which is joined to the central panel has a shorter length between the bottom of the recessed section and the outer circumferential edge of the central panel than a length of an outer wall, which is joined to the peripheral panel, between the bottom of the recessed section and the inner circumferential edge of the peripheral panel.

This configuration will not form a great step between a face of the region disposed in the vicinity of the center of the occupant-side wall and on the inner side of the recessed section (in other words, the face of the central panel) and a face of the region disposed towards the outer circumferential edge of the occupant-side wall and on the outside of the recessed section (in other words, the face of the peripheral panel). More specifically, when the driver's seat airbag is inflated, the occupant-side wall is likely to form a convex shape with the region of the central panel protruding towards the driver's seat. Accordingly, if the lengths of the opposing walls of the recessed section from the bottom of the recessed section are identical to each other, a great step will be formed between the central region of the occupant-side wall and the peripheral region disposed outside of the recessed section, and the central region will protrude farther towards the driver's seat than the peripheral region, such that the occupant-side wall will catch the driver with its limited area of the central region, not with the whole area. This will not give a good touch to the driver.

An airbag according to another invention of this application includes an occupant-side wall which is deployable towards a vehicle occupant for catching the occupant and a vehicle-side wall which is joined with the occupant-side wall and is supported by a vehicle body structure at airbag deployment. The occupant-side wall includes a central section and a peripheral section which surrounds the central section. The central section exerts a smaller reaction force than the peripheral section when the occupant-side wall catches the vehicle occupant.

With the above configuration, when a vehicle occupant is thrown head-on, not obliquely, against the occupant-side wall, the central section of the occupant-side wall will catch the head softly with the smaller reaction force while the peripheral section catches the thorax in a vicinity of the neck of the occupant with the greater reaction force in a secure and steady fashion.

Therefore, this airbag is capable of catching the occupant in an adequate fashion without giving an undue damage to the neck of the occupant.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
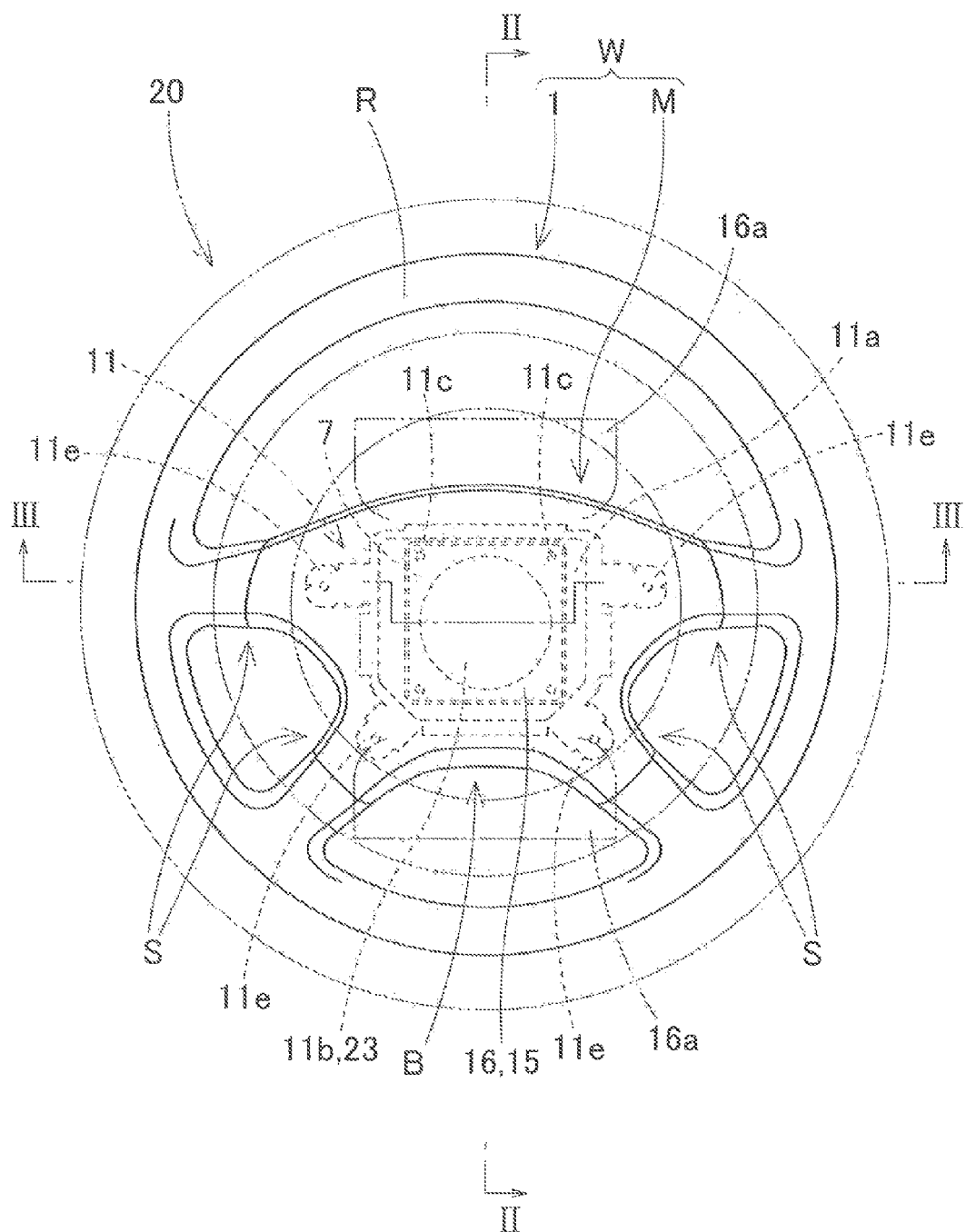
FIG. 1 is a schematic plan view of an airbag device for a driver's seat which employs an airbag embodying the present invention in service.
Figure 2:
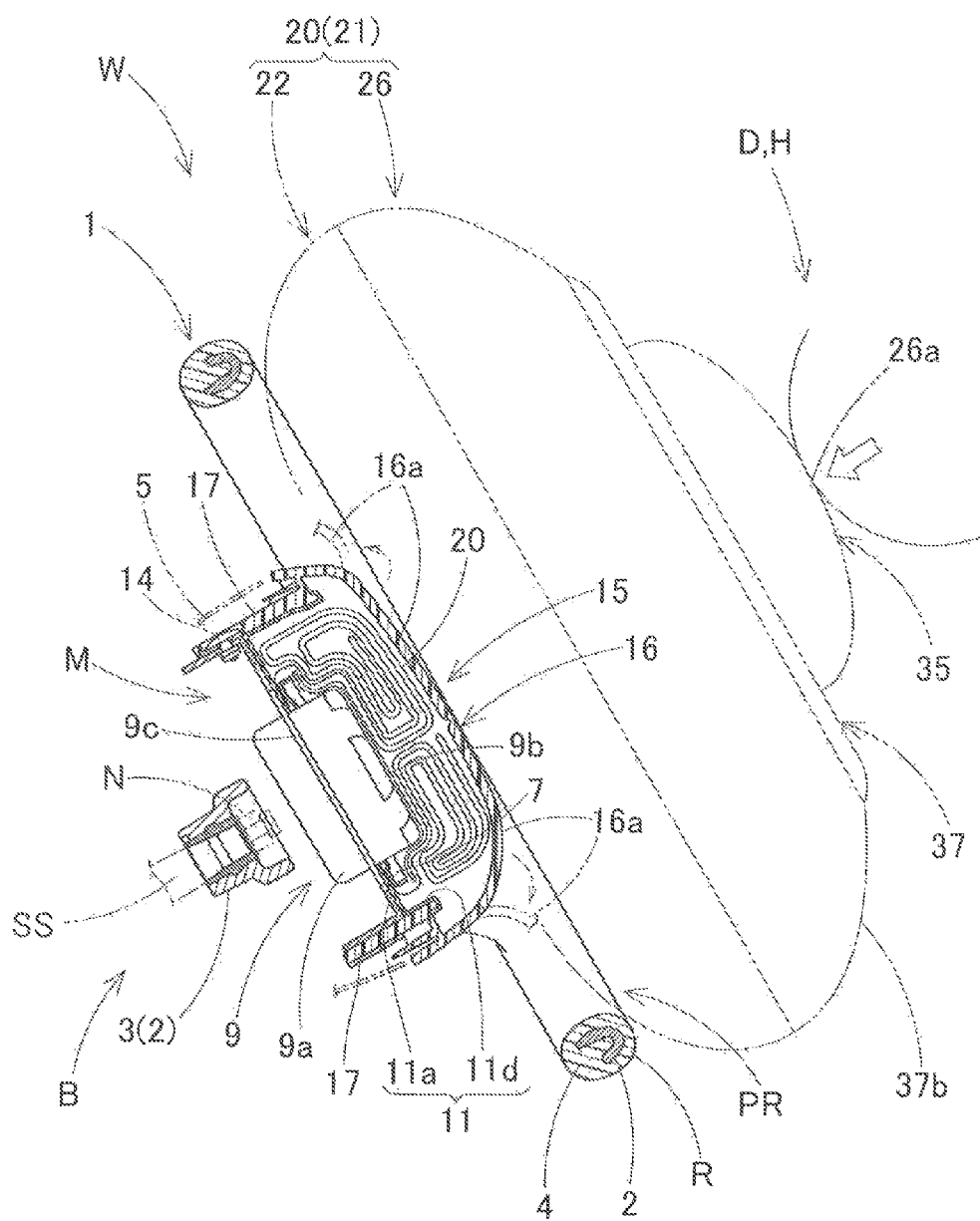
FIG. 2 is a schematic vertical section of the airbag device of FIG. 1 taken along line II-II of FIG. 1.

As shown in FIGS. 1 and 2, an airbag 20 embodying the invention is illustrated as an airbag for a driver's seat. The airbag device M for a driver's seat employing the airbag 20 is mounted on a steering wheel W. The steering wheel W includes a wheel body 1 and airbag device M disposed on top of a boss section B at the center of the wheel body 1. The wheel body 1 includes an annular rim R, the boss section B and four spokes S. The rim R is for holding at steering operation. The boss section B is disposed at the center of the rim R and is secured to a steering shaft SS. The spokes S interconnect the boss section B and the rim R.

In this specification, unless otherwise specified, an up and down direction corresponds to an up and down direction extending along an axial direction of the steering shaft SS. A front and rear direction corresponds to a front and rear direction extending orthogonally to the axial direction of the steering shaft SS of a vehicle being steered straight ahead, and a left and right direction corresponds to a left and right direction extending orthogonally to the axial direction of the steering shaft SS of the vehicle being steered straight ahead.

As shown in FIGS. 1 and 2, the steering wheel body 1 includes a core 2 of such metal as aluminum base alloy, and the core 2 has such a contour that the rim R, boss section B and spokes S are interconnected. The core 2 is covered with a cladding layer 4 of synthetic resin on the rim R and regions of the spokes S adjoining the rim R. At a region of the core 2 corresponding to the boss section B is a steel boss 3 through which the steering shaft SS is inserted and then fixed by a nut N. Underneath the wheel body 1 is a lower cover 5 made from synthetic resin for covering the lower side of the boss section B.

Figure 3:
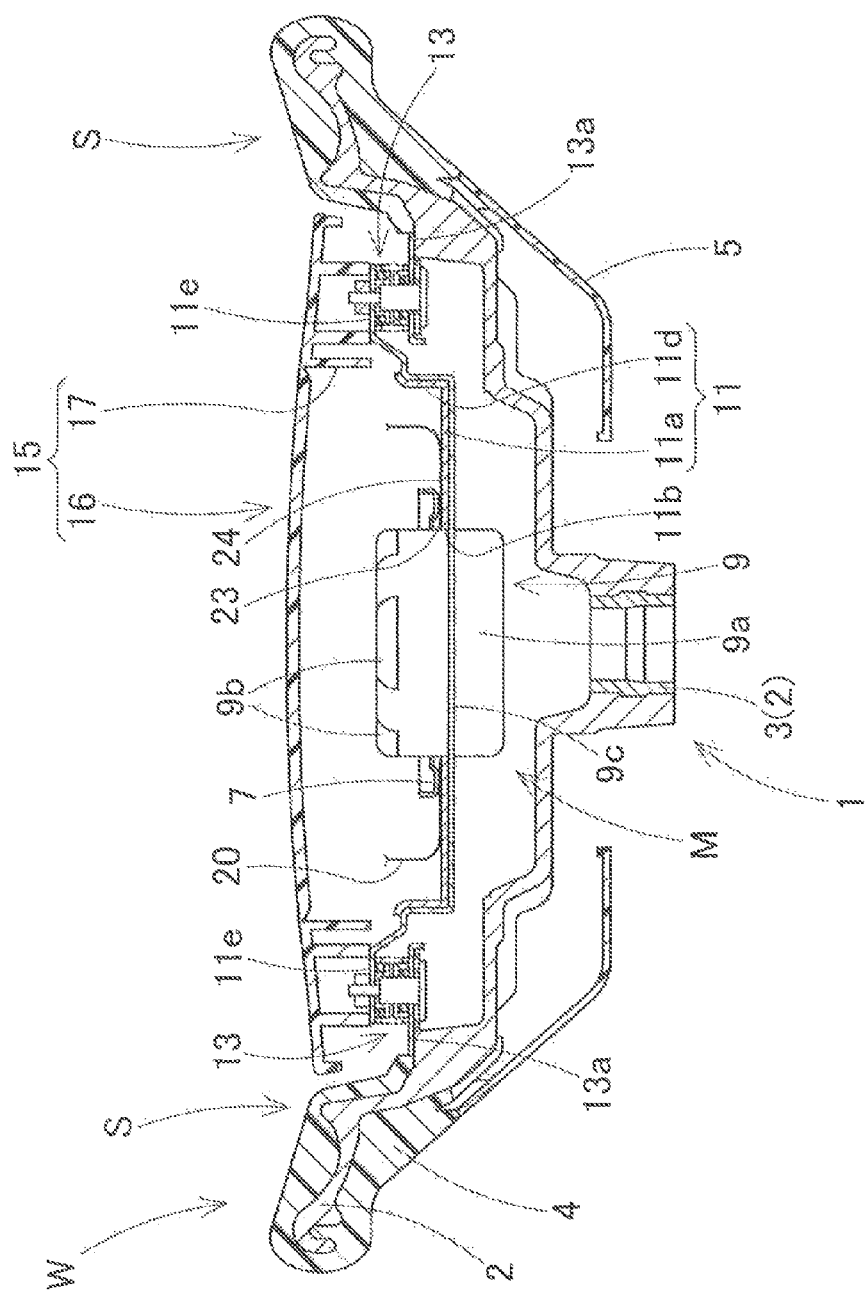
FIG. 3 is a schematic vertical section of the airbag device of FIG. 1 taken along line III-III of FIG. 1.

As shown in FIGS. 2 and 3, the airbag device M includes an airbag 20, which is folded up, an inflator 9 for supplying the airbag 20 with an inflation gas, an airbag cover 15 covering an upper side of the airbag 20, a case 11 housing the airbag 20 and the inflator 9 and supporting the airbag cover 15, and a retainer 7 used to mount the airbag 20 on the case 11 together with the inflator 9.

The retainer 7, which is made of a sheet metal, has a square annular contour and holds down a peripheral area of a later-described inlet opening 23 of the airbag 20. The retainer 7 is provided at the four corners with unillustrated bolts, which are nut fastened to the case 11 in order to mount the airbag 20 and the inflator 9 on the case 11.

The inflator 9 includes a body 9a and a flange 9c. The inflator body 9a is in the form of a pot and is provided, on the upper region, with a plurality of gas discharge ports 9b. The flange 9c protrudes out of an outer circumference of the body 9a and has unillustrated through holes for receiving the unillustrated bolts of the retainer 7.

As shown in FIGS. 1 to 3, the case 11 is disposed at an upper region of the boss section B of the steering wheel W, and serves as a housing of the airbag 20. The case 11 is made of sheet metal and formed into a generally rectangular parallelepiped. The case 11 includes a rectangular bottom wall 11a and a side wall 11d extending upward from an outer peripheral edge of the bottom wall 11a. The bottom wall 11a is provided with a circular insert hole 11b for receiving the body 9a of the inflator 9 from the lower side. Around the insert hole 11b are four through holes 11c (FIG. 1) for receiving the bolts of the retainer 7. At the upper end of the side wall 11d are mounting sections 11e extending outwardly. Mounting bases 13a of horn switch mechanisms 13 (FIG. 3) are attached to the mounting sections 11e, and the case 11 is secured to the core 2 of the steering wheel W with the aid of the mounting bases 13a. As a result, the airbag device M is mounted on the boss section B of the steering wheel body 1 which has been attached to the steering shaft SS. Moreover, a later-described side wall 17 of the airbag cover 15 is attached to the side wall 11d of the case 11 with rivets 14 or the like.

The airbag cover 15 is fabricated of synthetic resin and includes a ceiling wall 16 covering the airbag 20 from above and a side wall 17 having a generally square tubular shape extending downwardly from a vicinity of an outer peripheral edge of the ceiling wall 16. The ceiling wall 16 includes two doors 16a which are openable forward and rearward when pushed by the inflated airbag 20.

Figure 4:
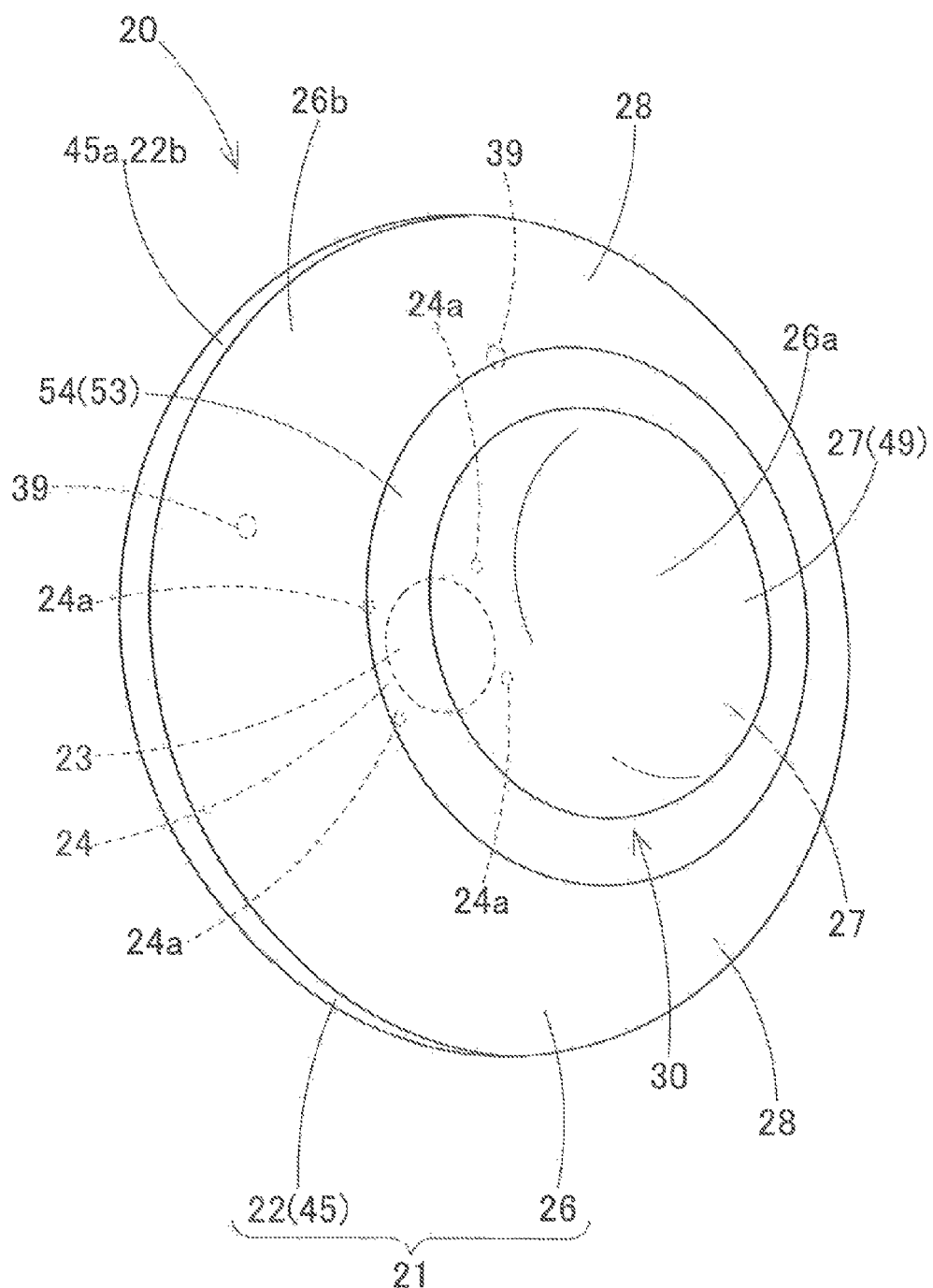
FIG. 4 is a schematic perspective view of the driver's seat airbag as inflated.

The airbag 20 is made of a fabric woven with polyamide yarn, polyester yarn or the like, and is inflatable into such a shape as is round when viewed from above and generally oval similar to a circle when viewed from the side, as shown in FIGS. 1, 2 and 4. As shown in FIGS. 2 and 4 to 7, an outer shell 21 of the airbag 20 includes a vehicle-side wall 22, which is deployable towards the steering wheel body 1 (i.e., towards the vehicle body structure or towards the rim R), and an occupant- or driver-side wall 26, which is deployable to face a driver D (i.e., a vehicle occupant).

The vehicle-side wall 22 is formed into a circular disc-like contour, and is provided, at the center, with a round inlet opening 23 for introducing an inflation gas. Around the inlet opening 23 are formed mounting holes 24a for receiving the bolts of the retainer 7 to mount the airbag 20 on the bottom wall 11a of the case 11. The region around the inlet opening 23 where the mounting holes 24a are formed serves as a mounting region 24 which is held down by the retainer 7 and mounted on the bottom wall 11a of the case 11.

Further, the vehicle-side wall 22 is provided with two vent holes 39 for releasing an extra inflation gas.

Moreover, the vehicle-side wall 22 is supported by an upper plane PR of the rim R and spokes S of the steering wheel W (i.e., the vehicle body structure) when the airbag 20 is fully deployed.

Figure 6:
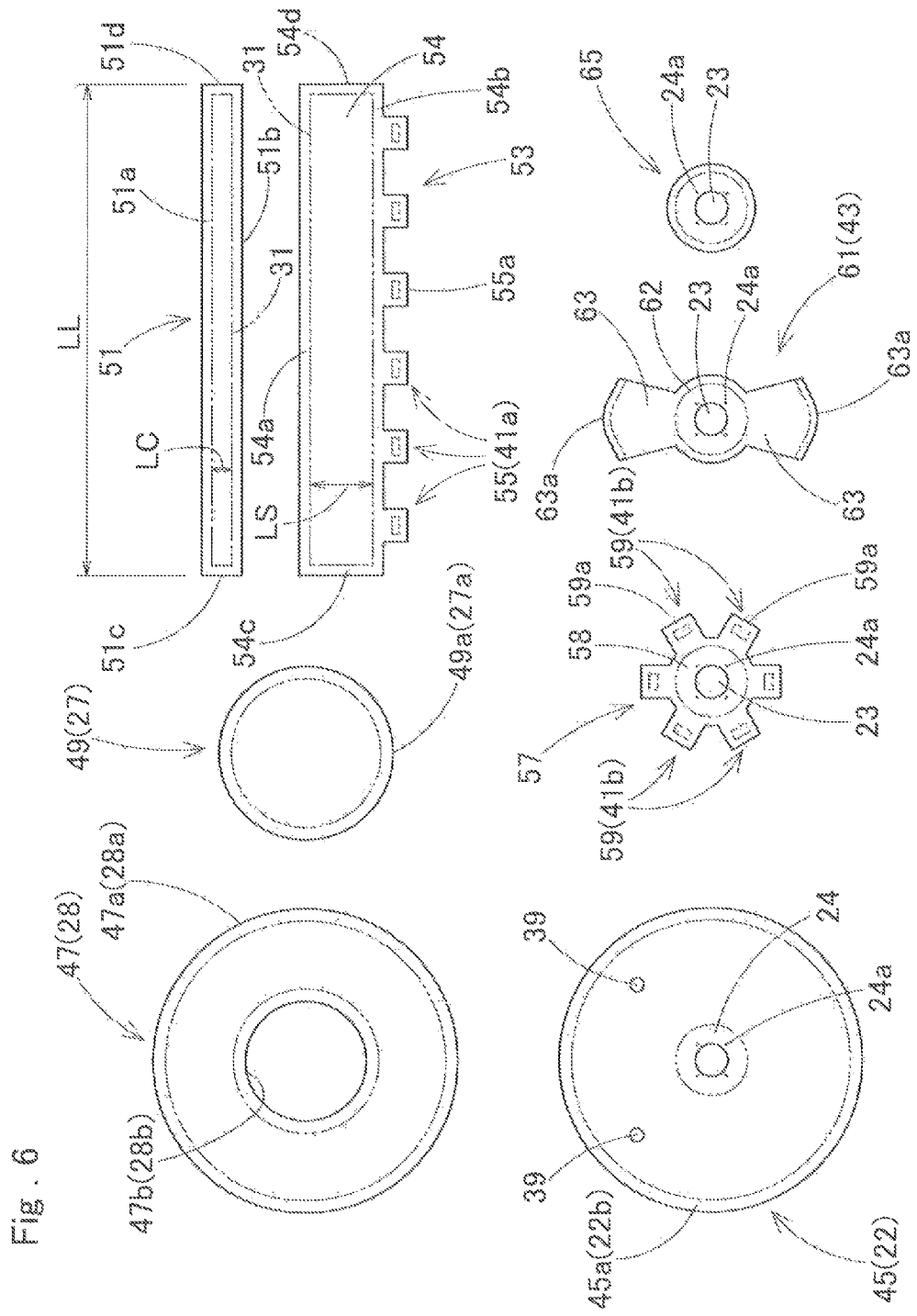
FIG. 6 depicts components of the airbag of FIG. 4 by plan views.

As shown in FIG. 6, reinforcing cloths 57 and 65 and a redirecting cloth 43 are sewn to the mounting region 24 of the vehicle-side wall 22. The inlet opening 23 and mounting holes 24a are formed on these members as well. The reinforcing cloths 57, 65 and redirecting cloth 43 are joined to the vehicle-side wall 22 with annular sewn seams 71 and 72 each of which is concentric to the inlet opening 23.

The redirecting cloth 43 is formed into a tube opening at the front and rear by being joined on opposite ends remote from the mounting region 24. The redirecting cloth 43 covers the inlet opening 23 inside the airbag 20 and redirects the inflation gas forward and rearward.

The driver-side wall (i.e., occupant-side wall) 26 includes a central section 27 which is disposed at the center 26a and has a circular disc-like shape, a peripheral section 28 which is annular in shape and surrounds the central section 27, and a recessed section 30 which is recessed or sunken in an annular fashion between an outer circumferential edge 27a of the central section 27 and an inner circumferential edge 28b of the peripheral section 28. The central section 27 is a circle greater than the mounting region 24 of the vehicle-side wall 22. The peripheral section 28 has an outer diameter identical to that of the vehicle-side wall 22.

Figure 7:
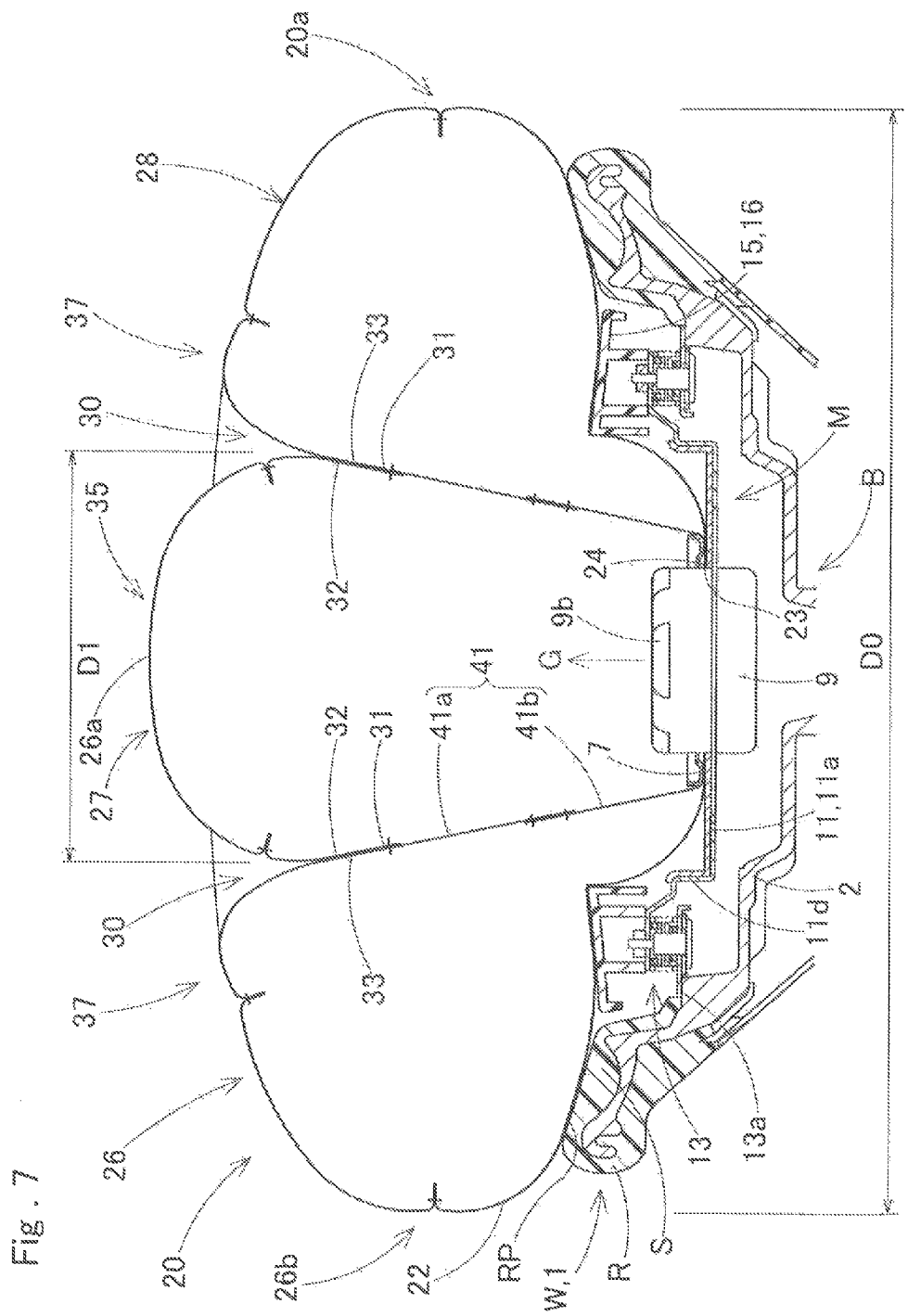
FIG. 7 is a schematic vertical section of the airbag device of FIG. 1 as actuated.

The recessed section 30 is configured to be sunken towards the boss section B at airbag deployment with the aid of a tether 41, as shown in FIG. 7. The recessed section 30 is composed of opposing walls 32 and 33, i.e., a center-side wall 32 deployable towards the center 26a of the driver-side wall 26 and an outer wall 33 deployable towards the outer circumferential edge 26b of the driver-side wall 26. At airbag deployment, the wall 32 and 33 press each other in a separable manner up to the bottom 31 of the recessed section 30 and form the recessed section 30, as shown in FIG. 7.

The tether 41 connects the bottom 31 of the recessed section 30 and a vicinity of an outer circumferential edge of the mounting region 24 of the vehicle-side wall 22. In the illustrated embodiment, six tethers 41 are provided radially about the inlet opening 23. More specifically, each of the tethers 41 is formed by joining together a lower region 41b which is composed of a leg 59 (FIG. 6) extending from the reinforcing cloth 57 and an upper region 41a which is composed of a leg 55 (FIG. 6) extending from the outer wall 33 of the recessed section 30 by sewing.

Since the tethers 41 are formed radially about the inlet opening 23 in an interspatial fashion, the gas communication is maintained between the central section 27 and peripheral section 28 of the driver-side wall 26 (i.e., between a later-described central raised region 35 of the airbag 20, which is disposed in a vicinity of the center 26a of the driver-side wall 26, and a later-described peripheral raised region 37 of the airbag 20, which is disposed on outside of the recessed section 30, in an interior of the airbag 20).

Figure 5:
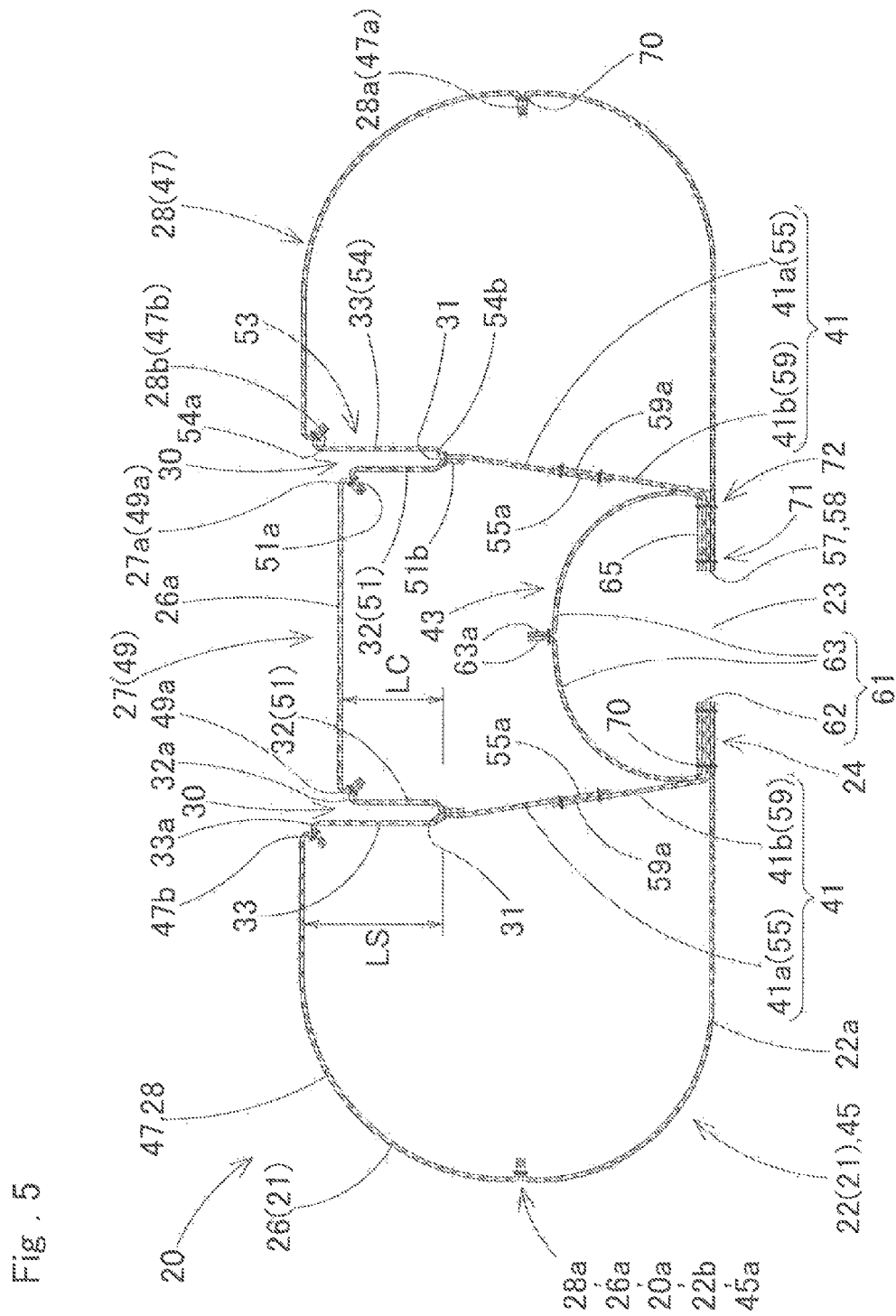
FIG. 5 is a schematic vertical section of the airbag of FIG. 4.

As shown in FIG. 5, a length LC of the center-side wall 32, out of the opposing walls 32 and 33, is shorter than a length LS of the outer wall 33. In the illustrated embodiment, the length LC of the center-side wall 32 is about two thirds of the length LS of the outer wall 33.

The length LS of the outer wall 33, i.e., the depth of the recessed section 30 up to the bottom 31, is about 100 mm.

As shown in FIG. 7, a diameter D0 of an outer circumferential edge 20a of the airbag 20 as inflated by itself is about 600 mm, and a diameter D1 of the central section 27 of the driver-side wall 22 is about 260 mm. The diameter D1 corresponds to the diameter of the recessed section 30.

Components of the airbag 20 are now described. As shown in FIG. 6, the airbag 20 is composed of a circular vehicle-side panel 45, an annular peripheral panel 47, a circular central panel 49, a band-shaped panel 51, a band-shaped panel 53 with legs, a generally circular reinforcing cloth 57 with legs, a panel 61 for forming the redirecting cloth and a circular reinforcing cloth 65. Each of these panels is fabricated of a flexible plain-weave fabric of such synthetic resin as polyamide or polyester, and suitably coated with silicone on the inner side of the airbag 20.

The vehicle-side panel 45 forms the vehicle-side wall 22, the peripheral panel 47 constitutes the peripheral section 28 of the driver-side wall 26, and the central panel 49 forms the central section 27 of the driver-side wall 26. The band-shaped panel 51 constitutes the center-side wall 32 of the recessed section 30. The band-shaped panel 53 with legs includes a band-shaped main region 54 which constructs the outer wall 33 of the recessed section 30 and legs 55 which protrude out of the lower edge 54b of the main region 54 and constitute the upper regions 41a of the tethers 41. The reinforcing cloth 57 with legs includes a generally circular main region 58 which is sewn and joined to the mounting region 24 and legs 59 which protrude out of the outer circumferential edge of the main region 58 and form the lower regions 41b of the tethers 41. The panel 61 for forming the redirecting cloth includes a generally circular main region 62 which is sewn and joined to the mounting region 24 and joint sections 63 which extend from left and right edges of the main region 62 and are joined together on the leading ends.

The length LL of the band-shaped panel 51 between the ends 51c and 51d is identical to the length LL of the main region 54 of the band-shaped panel 53 between the ends 54c and 54d. That is, the lengths LL of the seams 51b and 54b of the panels 51 and 54 are identical.

Production of the airbag 20 is now described. Firstly, the main region 58 of the reinforcing cloth 57 with legs is placed over the inner surface of the vehicle-side panel 45, at the location of the mounting region 24. Then the main region 62 of the panel 61 and the reinforcing cloth 65 are laid over there in order, and the three panels are sewn thereto with the annular seams 71 and 72 of sewing thread 70. Then the inlet opening 23, mounting holes 24a as well as the vent holes 39 are punched out. Subsequently, the leading ends 63a of the joint sections 63 of the panel 61 are sewn together to form the redirecting cloth 43.

In the meantime, the lower edge 51b of the band-shaped panel 51 and the lower edge 54b of the main region 54 of the band-shaped panel 53 with legs are sewn together with the sewing thread 70. The band-shaped panels 51 and 53 are sewn up by the ends 51c, 51d, 54c and 54d into a tube. Then the outer circumferential edge 49a of the central panel 49 and the upper edge 51a of the band-shaped panel 51 are sewn together while the inner circumferential edge 47b of the peripheral panel 47 and the upper edge 54a of the main region 54 of the band-shaped panel 53 are sewn together, respectively with the sewing thread 70. Thus the driver-side wall 26 with the recessed section 30 is prepared.

Thereafter, the vehicle-side wall 22 and driver-side wall 26 are mated with the outer surfaces facing inward and sewn together, with the sewing thread 70, by the outer circumferential edges 22b and 26b, in other words, by the outer circumferential edge 45a of the vehicle-side panel 45 and the outer circumferential edge 47a of the peripheral panel 47. Then the airbag 20 is reversed inside out via the inlet opening 23. Thus the outer shell 21 of the airbag 20 is formed. Subsequently, in order to form the tethers 41, the legs 55 of the band-shaped panel 53 and legs 59 of the reinforcing cloth 57 are taken out of the inlet opening 23, and sewn together by the ends 55a and 59a. If then the completed tethers 41 are put back into the airbag 20 via the inlet opening 23, the airbag 20 is completed.

To assemble the airbag device M, the retainer 7 is housed inside the airbag 20 such that the bolts of the retainer 7 project out of the mounting holes 24a, and then the airbag 20 is folded up. The airbag 20 is then wrapped up by a predetermined member for keeping the folded-up configuration. Then the airbag 20 is set on the bottom wall 11a of the case 11 such that the bolts of the retainer 7 protrude out of the through holes 11c. Subsequently, the body 9a of the inflator 9 is set in the insert hole 11b of the bottom wall 11a from the lower side such that the bolts of the retainer 7 go through the flange 9c. If the bolts of the retainer 7 are then fastened with unillustrated nuts, the airbag 20 and the inflator 9 are set in and secured to the case or housing 11, with the aid of the retainer 7. Thereafter, the airbag cover 15 is placed over the case 11 and the side wall 11d of the case 11 and the side wall 17 of the airbag cover 15 are joined together with the aid of rivets 14 or the like, thus the airbag cover 15 is mounted on the case 11. If then the horn switch mechanisms 13 are attached to the mounting pieces 11e of the case 11, the airbag device M is completed. Then the mounting bases 13a of the horn switch mechanisms 13 are used to mount the airbag device M on the steering wheel body 1, which has been mounted on the steering shaft SS. Thus the airbag device M is mounted on a vehicle.

When the airbag device M is actuated and an inflation gas G is fed to the airbag 20 via the inlet opening 23, the airbag 20 will be inflated and push and open the doors 16a of the airbag cover 15. Then the airbag 20 will protrude out of the case 11 and be deployed over and supported by the top plane PR of the rim R and spokes S, as shown in FIGS. 2 and 7.

In the airbag 20 of the embodiment, the tethers 41 connect the bottom 31 of the recessed section 30 to the vehicle-side wall 22, in other words, connect the driver-side wall 26 and vehicle-side wall 22. Therefore, the tethers 41 help prevent the driver-side wall 26 from moving too much away from the vehicle-side wall 22 and protruding rearward in an initial phase of airbag deployment.

Figure 8:
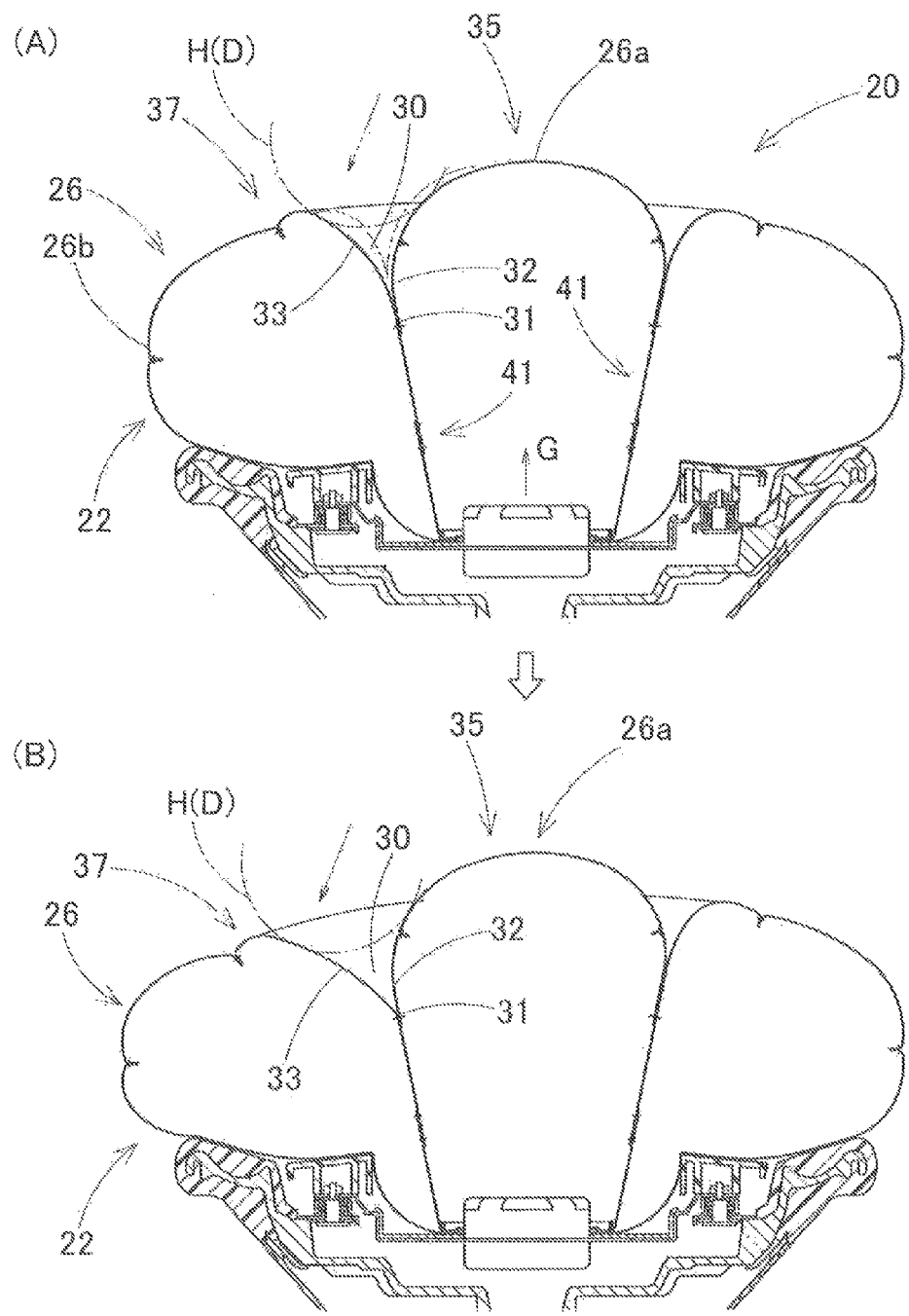
FIG. 8 shows the behavior of the airbag of the embodiment when catching a driver.

The opposing walls 32 and 33, which extend up to the bottom 31 of the recessed section 30 and form the recessed section 30, press each other in a separable fashion at airbag deployment. When, by way of example, the head H of a driver D, who moves obliquely towards left or right, hits a vicinity of the recessed section 30 as shown in (A) of FIG. 8, this configuration will enable an outer region 37 of the recessed section 30 (i.e., a peripheral raised region) to be deformed in such a manner as to follow the movement of the head H, as shown in (B) of FIG. 8. Therefore, the outer region 37 of the recessed section 30 will catch and cushion the head H of the driver D without turning the head H.

Figure 9:
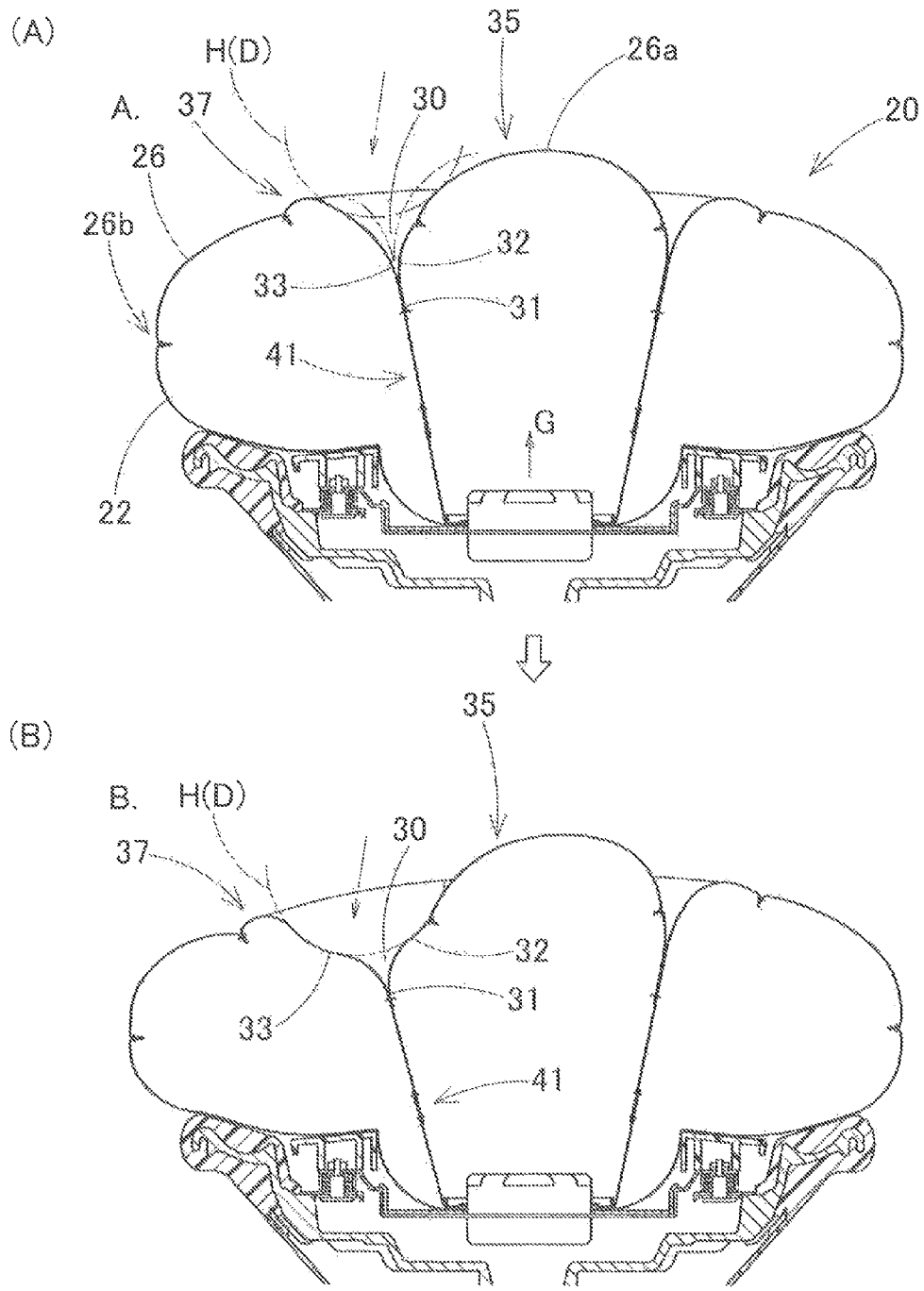
FIG. 9 shows another behavior of the airbag of the embodiment when catching a driver.

If, by way of another example, the head H of the driver D moving obliquely towards left or right hits a vicinity of the recessed section 30, the head H possibly enters into the recessed section 30 while separating the opposing walls 32 and 33 of the recessed section 30 from each other as shown in (A) and (B) of FIG. 9. In this instance, the walls 32 and 33 enfold the head H and catch and cushion the head H of the driver D without turning the head H.

In the airbag 20, moreover, the tethers 41 are configured in such a manner as to provide gas communication between the central raised region 35 of the airbag 20, which is disposed in a vicinity of the center 26a of the driver-side wall 26, and the peripheral raised region 37 of the airbag 20, which is disposed in a vicinity of the outer circumferential edge 26b of the driver-side wall 26 and on outside of the recessed section 30, inside the airbag 20. That is, the tethers 41 do not partition the interior of the airbag 20. This configuration will not cause a difference in pressure (internal pressure) between the central raised region 35 and peripheral raised region 37, such that the airbag 20 will be capable of catching the driver D in a suitable fashion with the central raised region 35 and peripheral raised region 37.

Therefore, the driver's seat airbag 20 of the illustrated embodiment does not protrude towards the driver D (i.e., towards the vehicle occupant) unduly in an initial phase of deployment and is capable of catching the driver D in an adequate fashion when he moves in an oblique direction.

It is needless to say that the airbag 20 is capable of catching the head H of the driver D in an adequate fashion in the event of a head-on collision of the vehicle as well with the central raised region 35 and peripheral raised region 37, as will be described later.

In the driver's seat airbag 20 of the foregoing embodiment, the recessed section 30 is formed in an annular fashion around the vicinity of the center 26a of the driver-side wall 26 at airbag deployment.

With this configuration, the recessed section 30 will be always disposed on the left and right of and in a vicinity of the center 26a of the driver-side wall 26 even when the steering wheel W is rotated, by way of example, at 90 degrees, in a similar fashion to an instance where the steering wheel W is steered straight ahead. That is, the airbag 20 will be able to protect the driver D or head H, when he moves obliquely, regardless of the steering angle of the steering wheel W.

In the driver's seat airbag 20 of the foregoing embodiment, moreover, the driver-side wall 26 is composed of the opposing walls 32 and 33 which form the recessed section 30, the peripheral panel 47 which is annular in shape and disposed on the outside of the recessed section 30, and the central panel 49 which is circular in shape and disposed on the inner side of the recessed section 30. The leading end 32a of the center-side wall 32, which is one of the opposing walls 32 and 33 of the recessed section 30, is joined to the outer circumferential edge 49a of the central panel 49, and the leading end 33a of the outer wall 33 is joined to the inner circumferential edge 47b of the peripheral panel 47.

With this configuration, the depth of the recessed section 30 will be easily adjusted by changing the length LC of the component 51 of the center-side wall 32 between the bottom 31 of the recessed section 30 and the leading end 32a and the length LS of the component 54 of the outer wall 33 of the recessed section 30 between the bottom 31 of the recessed section 30 and the leading end 33a.

Furthermore, with respect to the opposing walls 32 and 33 of the recessed section 33, the length LC of the center-side wall 32 which is joined to the central panel 49, i.e., the length LC between the bottom 31 of the recessed section 30 and the outer circumferential edge 49a of the central panel 49, is shorter than the length LS of the outer wall 33 which is joined to the peripheral panel 47, i.e., the length LS between the bottom 31 of the recessed section 30 and the inner circumferential edge 47b of the peripheral panel 47. In the illustrated embodiment, the length LC is about two thirds of the length LS, as shown in FIG. 5.

This configuration will not form a great step between a face of the region disposed in the vicinity of the center 26a of the driver-side wall 26 and on the inner side of the recessed section 30 (in other words, the face of the central panel 49 or the face of the central section 27) and a face of the region disposed towards the outer circumferential edge 26b of the driver-side wall 26 and on the outside of the recessed section 30 (in other words, the face of the peripheral panel 47 or the face of the peripheral section 28).

More specifically, when the airbag 20 is inflated, the driver-side wall 26 is likely to form a convex shape with the central section 27 protruding towards the driver's seat. Accordingly, if the length LC and length LS of the opposing walls 32 and 33 are identical to each other, a great step will be formed between the central section 27 and the peripheral section 28, and the central section 27 will protrude farther towards the driver's seat than the peripheral section 28, such that the driver-side wall 26 will catch the driver with a limited area of the central section 27, not with the whole area. This will not give a good touch to the driver D.

In the foregoing embodiment, the length LC of the center-side wall 32 is about two thirds (67 percent) of the length LS of the outer wall 33. If the length LC of the center-side wall 32 is too short, the central section 27 will be too sunken. Therefore, when the depth LS of the recessed section 30 is about 50 to 200 mm (100 mm, in the illustrated embodiment), the length LC of the center-side wall 32 is desirably within a range of 30 to 80 percent of the length LS of the outer wall 33, further desirably within a range of 50 to 70 percent.

Of course, in order to attain a desired working effect of the invention, the diameter D1 of the recessed section 30 cannot be too small or too great relative to the outer diameter D0 of the airbag 20. The diameter D1 of the recessed section 30 is desirably within a range of 200 to 350 mm. The diameter D1 of the illustrated embodiment is 260 mm.

Figure 10A:
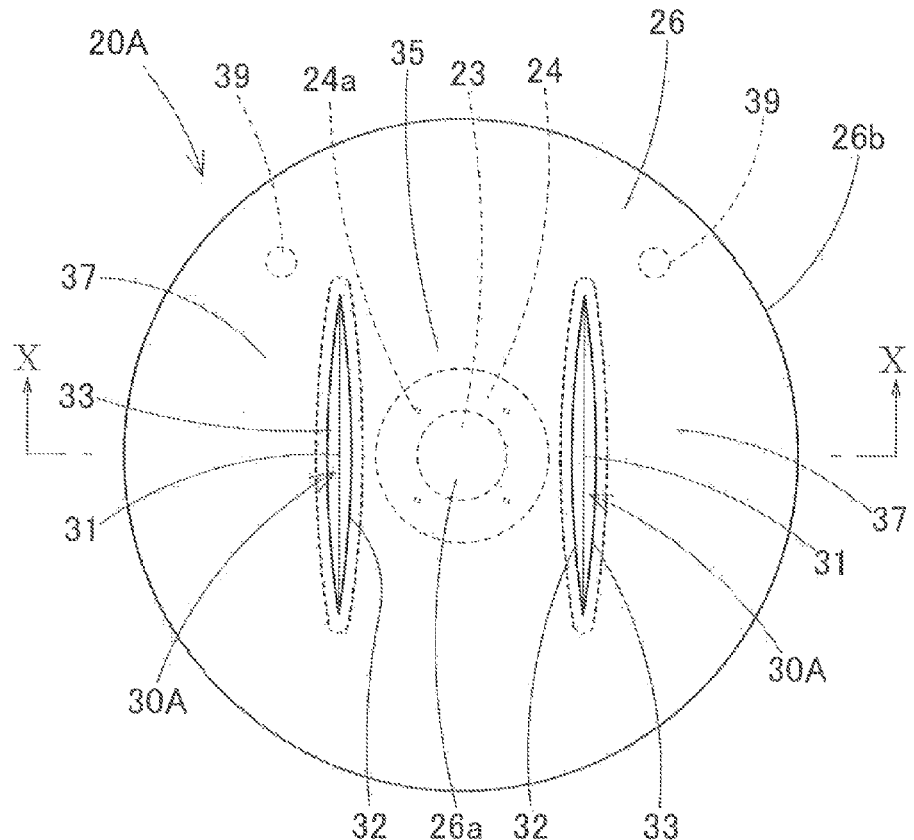
FIG. 10A is a plan view of a modification of the driver's seat airbag.
Figure 10B:
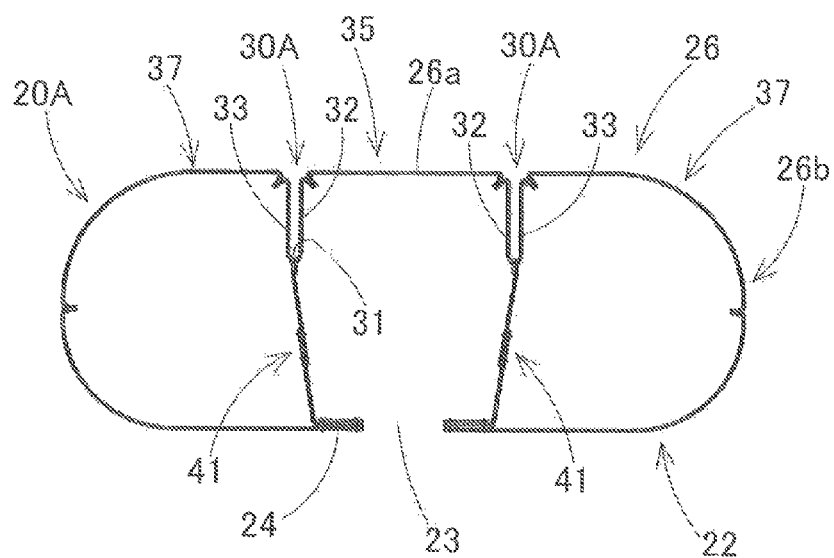
FIG. 10B is a schematic vertical section taken along line X-X of FIG. 10A.

In the foregoing embodiment, the recessed section 30 is formed in an annular shape around the center 26a of the driver-side wall 26. Alternatively, the recessed section 30A may be formed at two positions on the left and right of and in a vicinity of the center 26a of the driver-side wall 26 (i.e., occupant-side wall) in a separated fashion as in an airbag 20A shown in FIG. 10A. Each of the recessed sections 30A is formed to extend along a front-rear direction. As shown in FIG. 10B, the tethers 41 connect the bottoms 31 of the recessed sections 30A to the vehicle-side wall 22 in order to form the recessed sections 30A. The opposing walls 32 and 33 which extend up to the bottom 31 of each of the recessed sections 30A and form each of the recessed sections 30A are configured to press each other in a separable fashion when the airbag 20A is fully inflated. The tethers 41 are also provided separately in the left and right regions of the airbag 20A, such that a gas communication is maintained between a central region of the airbag 20A as inflated, which is disposed in a vicinity of the center 26a of the driver-side wall 26, and a peripheral region of the airbag 20A as inflated, which is disposed towards the outer circumferential edge 26b of the driver-side wall 26, in an interior of the airbag 20A.

The airbag 20A is also used in an airbag device M for a driver's seat. When the airbag device M is actuated and an inflation gas is fed to inflate the airbag 20A, the tethers 41 connect the driver-side wall 26 and vehicle-side wall 22 and suppress the driver-side wall 26 from protruding rearward in an initial phase of airbag deployment.

The opposing walls 32 and 33 of each of the recessed sections 30A press each other in a separable fashion at airbag deployment. When, by way of example, the head H of a driver D, who moves obliquely towards left or right, hits a vicinity of one of the recessed sections 30A, this configuration will enable the outer region 37 of the recessed section 30A (i.e., the peripheral raised region) to be deformed in such a manner as to follow the movement of the head H. Therefore, the peripheral raised region 37 will catch and cushion the head H of the driver D without turning the head H.

If, by way of another example, the head H of a driver D moving obliquely towards left or right hits a vicinity of one of the recessed sections 30A, the head H possibly enters into the recessed section 30A while separating the opposing walls 32 and 33 of the recessed section 30A from each other. In this instance, the walls 32 and 33 enfold the head H and catch and cushion the head H of the driver D without turning the head H.

In the airbag 20A, moreover, the tethers 41 are configured to provide gas communication between the central raised region 35 of the airbag 20A, which is disposed in the vicinity of the center 26a of the driver-side wall 26, and the peripheral raised region 37 of the airbag 20A, which is disposed towards the outer circumferential edge 26b of the driver-side wall 26, inside the airbag 20A. That is, the tethers 41 do not partition the interior of the airbag 20A. This configuration will not cause a difference in internal pressure between the central raised region 35 and peripheral raised region 37, such that the airbag 20A will be capable of catching the driver D in a suitable fashion with the central raised region 35 and peripheral raised region 37. That is, the airbag 20A will exert similar working effects to the airbag 20 of the foregoing embodiment.

Figure 11:
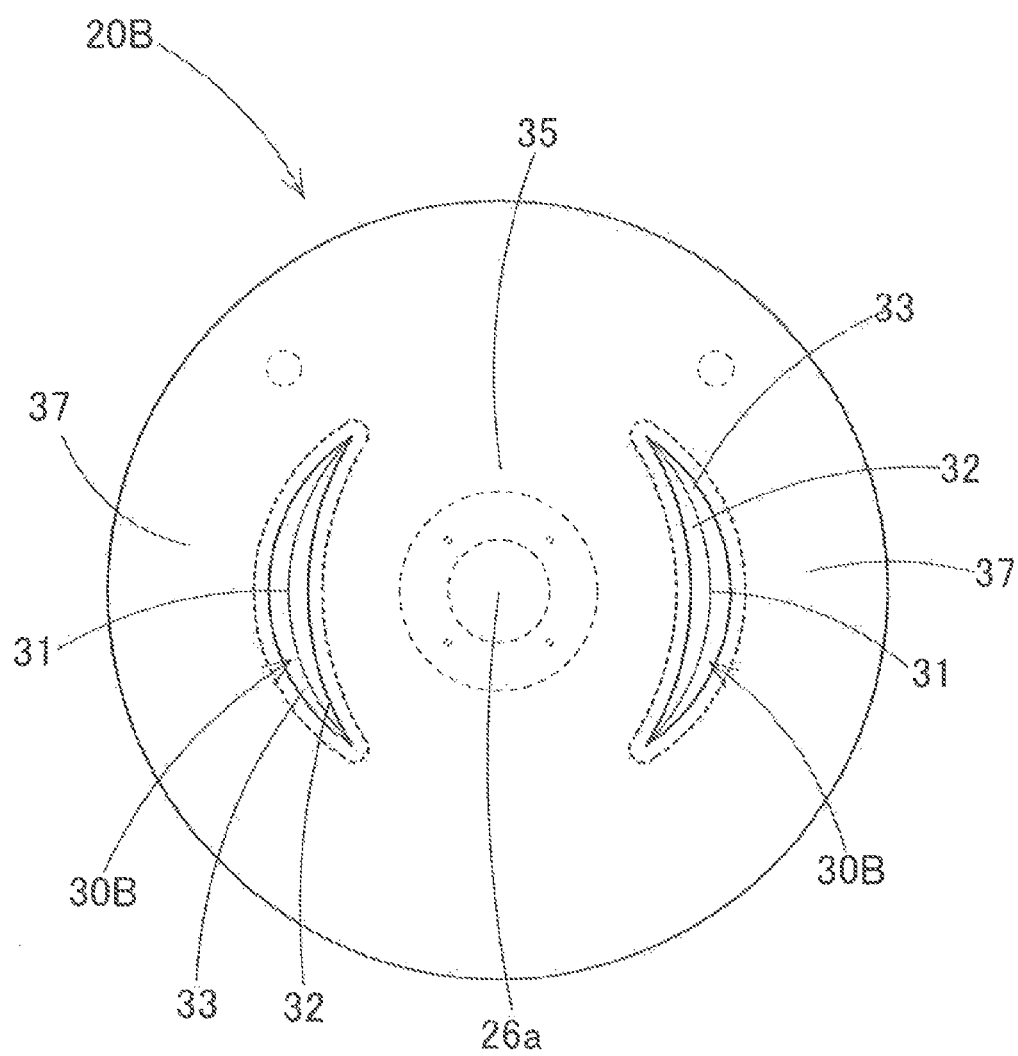
FIG. 11 is a plan view of another modification of the driver's seat airbag.

Further alternatively, when the recessed sections are formed separately on the left and right of and in the vicinity of the center 26a of the driver-side wall 26, each of the recessed sections may be formed into an arch-like shape around the center 26a of the driver-side wall 26, as the recessed sections 30B of an airbag 20B depicted in FIG. 11.

Figure 12:
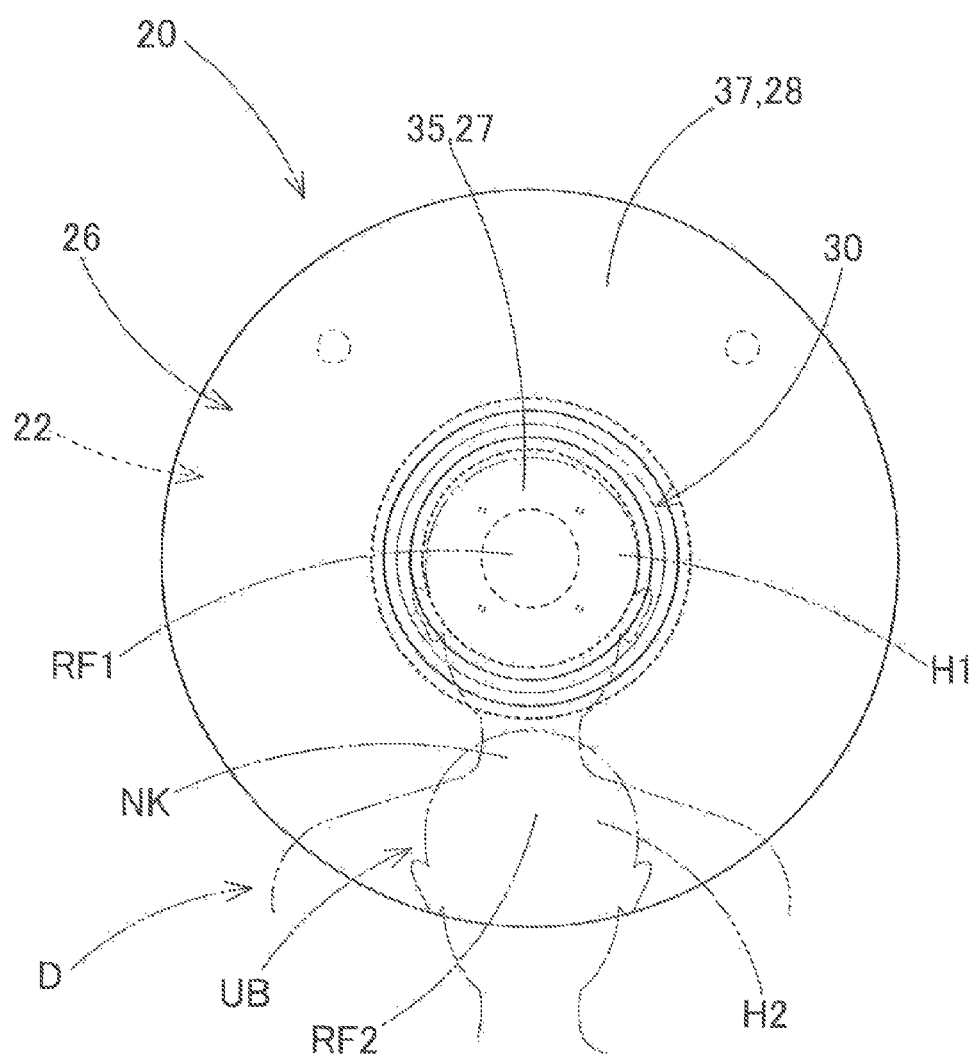
FIG. 12 illustrates the operation of the airbag of the embodiment.

Back to the airbag 20, although there is no difference in internal pressure between the central raised region 35 and peripheral raised region 37, the central section 27 of the driver-side wall (i.e., occupant-side wall) 26 is configured to exert a smaller reaction force than the peripheral section 28 when the airbag 20 as mounted on the steering wheel W is fully inflated. That is, as shown in FIG. 12, when the head H1 is thrown head-on against the central section 27 of the driver-side wall 26 while the head H2 of the driver D is thrown head-on against the peripheral section 28 of the driver-side wall 26 for the same stroke as the head H1, the reaction force RF1 of the central section 27 acting on the head H1 is smaller than the reaction force RF2 of the peripheral section 28 acting on the head H2. In this specific embodiment, the reaction force RF1 is about one third of the reaction force RF2.

That is, when the central raised region 35 of the airbag 20 catches the head H1, the central section 27 of the driver-side wall 26 can easily dent since the inflation gas G disposed below the central section 27 can easily flow out into the peripheral raised region 37. On the other hand, when the peripheral raised region 37 catches the head H2, the peripheral section 28 of the driver-side wall 26 cannot dent partially easily since the peripheral section 28 of the driver-side wall 26 is continuous with the vehicle-side wall 22 and the outer wall 33 of the recessed section 30 and thus the peripheral raised region 37 is tense in an annular shape. Accordingly, the reaction force RF2 is supposedly greater than the reaction force RF1 although there is no difference in internal pressure between the central raised region 35 and peripheral raised region 37.

With the above configuration, when the driver (occupant) D is thrown head-on, not obliquely, against the driver-side wall (occupant-side wall) 26, the central section 27 of the driver-side wall 26 will catch the head H1 softly with a small reaction force RF1 while the peripheral section 28 catches and holds the thorax UB in a vicinity of the neck NK of the driver D with a great reaction force RF2 in a secure and steady fashion.

Therefore, the airbag 20 of the embodiment is capable of catching the driver D without giving an undue damage to the neck NK of the driver D.

In the driver's seat airbag 20 of the foregoing embodiment, moreover, the height of the peripheral raised section 37 from the rim R can be set lower than that of the central raised section 35, as indicated by double-dotted lines in FIG. 2. That is, with the height of the central raised region 35 from the rim R set identical to that of a conventional driver's seat airbag, the height of the peripheral raised region 37, which is disposed outside of the recessed section 30, can be set even lower than that of the conventional airbag. As a consequence, the rear region 37b of the peripheral raised region 37 of the airbag 20 will be smoothly deployed between a limited space between the abdomen of the driver D and the rim R of the steering wheel W.

The foregoing embodiments have been described on the airbags 20, 20A and 20B for a driver's seat. However, the present invention can also be applied to an airbag for a front passenger seat which is mounted on an instrument panel disposed in front of a front passenger seat and is inflatable with an inflation gas in such a manner as to separate a vehicle-side wall, which is deployable towards a vehicle body structure (i.e., towards the instrument panel), and an occupant-side wall, which is deployable towards a vehicle occupant for catching the occupant. The airbag is supported by the instrument panel on the vehicle-side wall when catching the occupant with the occupant-side wall. If this airbag includes: a recessed section that is recessed towards the vehicle-side wall on left and right sides of and in a vicinity of the center of the occupant-side wall as fully inflated, a tether that connects the bottom of the recessed section to the vehicle-side wall in order to form the recessed section, and if the tether is configured in such a manner as to provide gas communication between a central region of the airbag as inflated, which is disposed in a vicinity of the center of the occupant-side wall, and a peripheral region of the airbag as inflated, which surrounds the central region and is disposed in a vicinity of the outer circumferential edge of the occupant-side wall, in an interior of the airbag, and if a pair of opposing walls of the recessed section press each other in a separable fashion when the airbag is fully inflated, the airbag will provide the same working effects as the airbag 20 of the foregoing embodiment.

What is claimed is:

1. An airbag adapted to be mounted on a vehicle, the airbag being inflatable with an inflation gas in such a manner as to separate a vehicle-side wall, which is deployable towards a vehicle body structure, and an occupant-side wall, which is deployable towards a vehicle occupant for catching the occupant, the airbag being configured to be supported by the vehicle body structure on the vehicle-side wall when catching the occupant with the occupant-side wall, the airbag comprising:
    a recessed section that is recessed towards the vehicle-side wall on left and right sides of and in a vicinity of a center of the occupant-side wall as fully inflated;
    a tether that connects a bottom of the recessed section to the vehicle-side wall in order to form the recessed section, and the tether is configured in such a manner as to provide gas communication between a central region of the airbag as inflated, which is disposed in a vicinity of the center of the occupant-side wall, and a peripheral region of the airbag as inflated, which surrounds the central region and is disposed in a vicinity of an outer circumferential edge of the occupant-side wall, in an interior of the airbag; and
    a pair of opposing walls that extend from the bottom of the recessed section to the occupant-side wall in an opposed fashion and form the recessed section, wherein the opposing walls press each other in a separable fashion when the airbag is fully inflated.

2. The airbag according to claim 1, wherein the airbag is adapted to be mounted on a boss section of a steering wheel, which is disposed in a vicinity of a generally center of a rim of the steering wheel such that the vehicle-side wall is deployable towards the rim and the occupant-side wall is deployable towards a driver's seat for catching a driver.

3. The airbag according to claim 2, wherein the recessed section is formed at two positions in left and right regions of the airbag in a separated fashion.

4. The airbag according to claim 2, wherein the recessed section is formed in an annular fashion around the vicinity of the center of the occupant-side wall.

5. The airbag according to claim 4, wherein:
    the occupant-side wall is composed of the opposing walls which form the recessed section, a peripheral panel which is annular in shape and disposed on an outside of the recessed section, and a central panel which is circular in shape and disposed on an inner side of the recessed section; and
    each of the opposing walls of the recessed section is joined to an outer circumferential edge of the central panel and an inner circumferential edge of the peripheral panel.

6. The airbag according to claim 5, wherein, out of the opposing walls of the recessed section, a center-side wall which is joined to the central panel has a shorter length between the bottom of the recessed section and the outer circumferential edge of the central panel than a length of an outer wall, which is joined to the peripheral panel, between the bottom of the recessed section and the inner circumferential edge of the peripheral panel.

7. The airbag according to claim 6, wherein the length of the outer wall of the opposing walls between the bottom of the recessed section to the inner circumferential edge of the peripheral panel is within a range of 50 to 200 mm.

8. The airbag according to claim 7, wherein the length of the center-side wall of the opposing walls between the bottom of the recessed section to the outer circumferential edge of the central panel is within a range of 30 to 80 percent of the length of the outer wall.

9. The airbag according to claim 6, wherein a diameter of the recessed section is within a range of 200 to 350 mm.

* * * * *